United States Patent [19]
Takagi

[11] Patent Number: 5,290,085
[45] Date of Patent: Mar. 1, 1994

[54] VEHICLE WINDSHIELD COVER WITH PERIMETER SKIRT

[76] Inventor: Hideaki Takagi, No. 13-9, 1-chome, Ai-Gein, Minoo, Osaka, 562, Japan

[21] Appl. No.: 48,836

[22] Filed: Apr. 15, 1993

[51] Int. Cl.$^5$ ............................................. B60J 11/00
[52] U.S. Cl. ............................. 296/95.1; 296/97.7; 160/370.2 R
[58] Field of Search ............................ 296/95.1, 97.7; 160/370.2

[56] References Cited

U.S. PATENT DOCUMENTS

| | | | |
|---|---|---|---|
| 3,184,264 | 5/1965 | Ealey et al. | 296/95.1 |
| 3,338,293 | 8/1967 | Hohmann | 296/95.1 |
| 3,751,100 | 8/1973 | Keyes | 296/95.1 |
| 4,109,957 | 8/1978 | Polizzi et al. | 296/95.1 |
| 4,428,412 | 1/1984 | Toro | 160/23 R |
| 4,784,215 | 11/1988 | Sing | 296/95.1 X |
| 4,811,982 | 3/1989 | Carlyle | 296/95.1 |
| 4,823,859 | 4/1989 | Park | 160/370.2 |
| 4,893,668 | 1/1990 | Nomura | 160/327 |
| 4,966,405 | 10/1990 | Tremaine et al. | 296/95.1 |
| 4,994,548 | 7/1990 | Payne et al. | 160/370.2 |
| 5,002,326 | 3/1991 | Westfield et al. | 296/95.1 |
| 5,123,468 | 6/1992 | Mater, Jr. | 296/95.1 |
| 5,211,438 | 5/1993 | Snow | 296/95. |

FOREIGN PATENT DOCUMENTS

| | | |
|---|---|---|
| 545874 | 3/1956 | Belgium . |
| 1213893 | 11/1959 | France . |
| 1381059 | 6/1964 | France . |
| 160946 | 2/1956 | Netherlands . |

Primary Examiner—Robert R. Song
Attorney, Agent, or Firm—Crutsinger & Booth

[57] ABSTRACT

The invention provides a complete coverage and sealing of the windshield or window of a vehicle against accumulations of frost, freezing rain, and snow and also protects against heat and sunlight. The protective cover includes the following combination: a sheet formed of a suitable structural material for overlaying at least a portion of the windshield or window; the sheet having a skirt formed or attached to the perimeter of the sheet; and a plurality of suction cups attached to the sheet or skirt for mounting the cover to the windshield or window whereby the skirt substantially seals the perimeter of the gap between the sheet and the windshield or window to form a chamber. The suction cups allow the shield to be easily mounted to the windshield or window and subsequently removed after use. For protection against freezing accumulations, the cover is used outside the window, whereas for protection against the sun, the cover of the invention can be advantageously used either inside or outside of the windshield or window.

11 Claims, 4 Drawing Sheets

VEHICLE WINDSHIELD COVER WITH PERIMETER SKIRT

FIELD OF THE INVENTION

This invention relates to improvements in vehicle windshield and window protection devices. More particularly, the invention relates to a detachable cover for a windshield or window.

BACKGROUND OF THE INVENTION

In geographical areas subject to cold winter climates, periods of near or below freezing weather can cause heavy frost, freezing rain, or snow to accumulate on the windshields and other windows of automobiles, trucks, and other vehicles. The frozen accumulation on the windshields obstructs the vision of the driver or operator of the vehicle and presents difficulties in cleaning. Most people have experienced the unpleasant task of standing outside in the bitter cold and laboriously scraping the frozen accumulation from the windshield and other windows of their car.

The summer periods also pose problems. The intensity of the summer sun can cause temperatures inside a parked vehicle to soar to extremely high temperatures. The seat and steering wheel can become too hot to touch. The exposure of the leather, plastics, rubber, wood, and other materials of the dashboard and passenger compartment to the intense heat and ultraviolet light from the sun can also cause the materials to fade, crack, and appear weathered.

Interior heating of the vehicle can very slowly melt some of the frozen accumulation, but usually not adequately to provide good visibility and usually time does not permit the driver or operator to wait several minutes for the heating to take effect. Leaving the engine running for the necessary time to defrost the windshield and windows before driving the vehicle is also wasteful of fuel. Similarly, running the air-conditioning of the vehicle, if it has air-conditioning, can slowly reduce the temperature within the passenger compartment, but usually time does not permit the driver to wait so long. Furthermore, air-conditioning can cool the interior of the car, but it cannot reverse the damage to the materials of the dashboard and passenger compartment caused by exposure to the sun.

One remedy for these types of problems, of course, is park the vehicle in a garage, however, as can be appreciated, this solution is expensive and not always available.

Generally speaking, the alternative way of protecting against frozen accumulations involves placing a sheet of paper, canvas, plastic, or other material over the outside of the windshield. However, unless somehow secured to the windshield, these materials are subject to being displaced by the wind or the weight of ice and snow, leaving the windshield unprotected. Furthermore, rain, sleet, or snow can easily penetrate the gaps between the edges of the sheet and the windshield to accumulate on the windshield underneath the sheet.

An alternative way of protecting against overheating and sunlight exposure has been to place an appropriately shaped shield inside the passenger compartment, behind the windshield and above the dash-board to at least partially block direct sunlight. However, the placement of these devices inside the vehicle creates a gap between the windshield and the devices, such that air is heated in the gap and then circulates around the perimeter of the shield and throughout the passenger compartment, thus creating a classic example of the "greenhouse" heating effect.

Several prior art references disclose using suction cups for attaching a protective cover to the exterior of a vehicle windshield, for example, U.S. Pat. No. 4,966,405 issued Oct. 30, 1992 to Shawn A. Tremaine et al.; U.S. Pat. No. 3,338,293 issued Aug. 16, 1965 to William R. Hohmann; and U.S. Pat. No. 3,184,264 issued May 18, 1965 to J. C. Ealey et al. Other prior art references disclose various devices that are attached to the interior of the vehicle windshield or window for providing shade against the sun, for example, U.S. Pat. No. 4,944,548 issued Jul. 31, 1990 to George E. Payne et al.; U.S. Pat. No. 4,893,68 issued Jan. 16, 1990 to Chieko Nomura; U.S. Pat. No. 4,823,859 issued Apr. 25, 1989 to Steve S. Park; U.S. Pat. No. 4,428,412 issued Jan. 31, 1984 to Adras I. Toro; U.S. Pat. No. 4,109,957 issued Aug. 29, 1978 to Joseph R. Polizzi et al.; and U.S. Pat. No. 3,751,100 issued Aug. 7, 1973 to Robert A. Keys.

However, none of these references, separately or in combination, teach or suggest a protective cover that effectively seals the edges of the cover to the windshield or window to prevent frozen accumulation underneath the cover. Furthermore, none of the references, separately or in combination, teach or suggest a protective cover that provides an isolated chamber that minimizes the greenhouse effect and insulates the passenger compartment against the sun.

SUMMARY OF THE INVENTION

The present invention provides a complete coverage and sealing of the windshield or window of a vehicle with a cover having the following combination of features: a sheet formed of a suitable structural material for overlaying at least a portion of the windshield or window; the sheet having a skirt formed or attached to the perimeter of the sheet; and a plurality of suction cups attached to the sheet or skirt for mounting the cover to the windshield or window whereby the skirt substantially seals the perimeter of the gap between the sheet and the windshield or window to form a chamber. Extra suction cups can be added to the middle section of the sheet, if needed to securely mount the cover to a larger or wider windshield or window. The suction cups allow the shield to be easily mounted to the windshield or window and subsequently removed after use. For protection against the sun, the cover of the invention can be advantageously used either inside or outside of the windshield or window.

The invention resides not in any one of these features by itself, but rather in the particular combinations of the disclosed features as claimed, and it is distinguished from the prior art in the combination of all its structural features, functions, and steps.

Thus, it is an object of the invention to provide a easily attachable and removable shade, made of simple construction that prevents the windshield or window from the accumulation of frost, snow, and ice in the winter and protects the interior of an automobile from overheating and sunlight in the summer.

BRIEF DESCRIPTION OF THE DRAWING

The accompanying drawings are incorporated into and form a part of the specification to illustrate several examples of the present invention. These drawings and the detailed description of the preferred embodiments serve to explain the principles of the invention. The drawings are only for the purpose of illustrating the presently preferred examples of how the invention can be made and used, and the drawings are not to be construed as limiting the invention to only the illustrated embodiment of the invention. The various advantages and features of the present invention will be apparent from a consideration of the drawings in which.

DETAILED DESCRIPTION OF PREFERRED EMBODIMENTS

Figure 1:
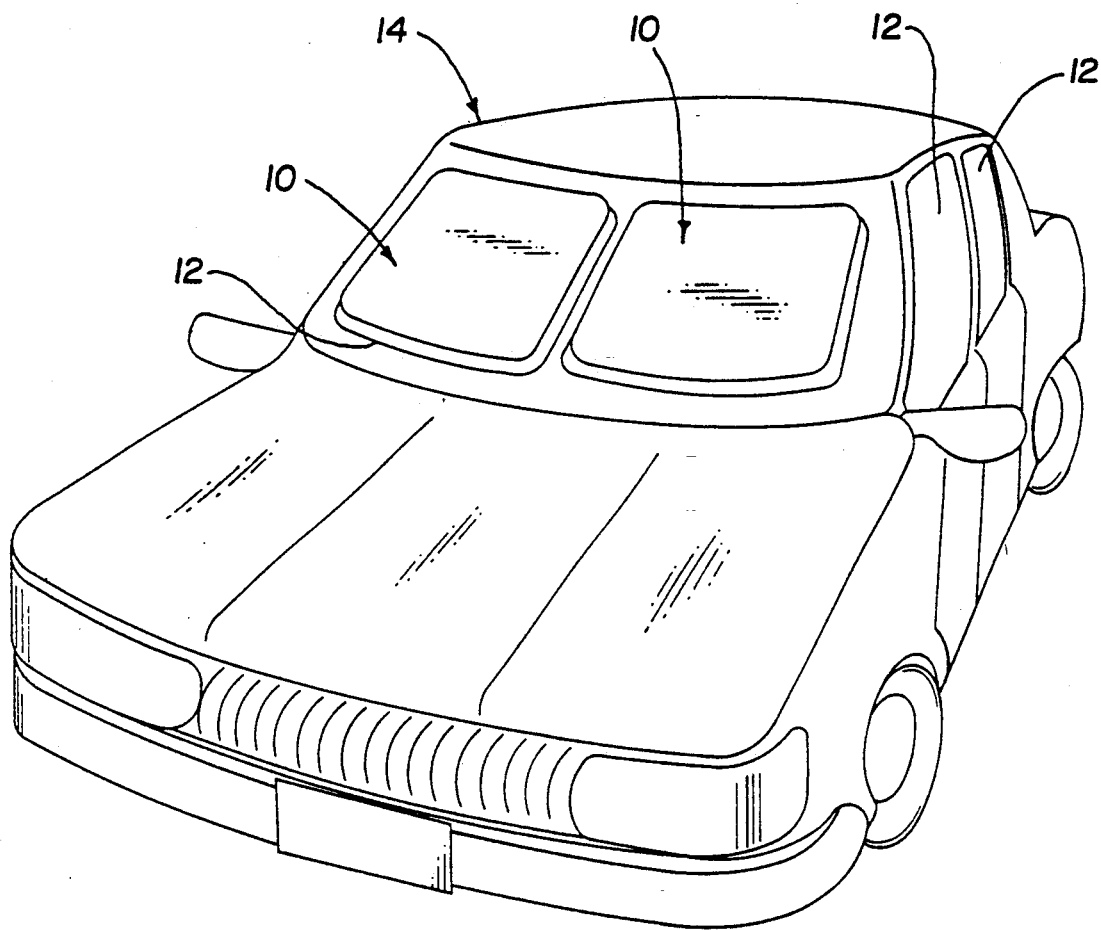
FIG. 1 is an illustration of a typical automobile showing two covers according to one embodiment of the present invention mounted to the forward windshield of the vehicle.
Figure 2:
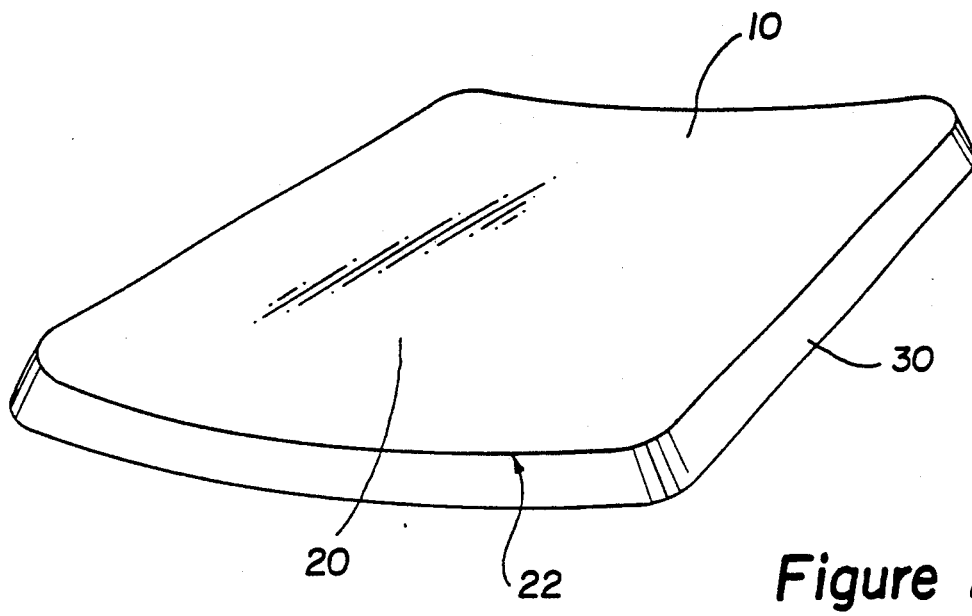
FIG. 2 is a perspective view from the one side of the cover of the present invention.
Figure 3:
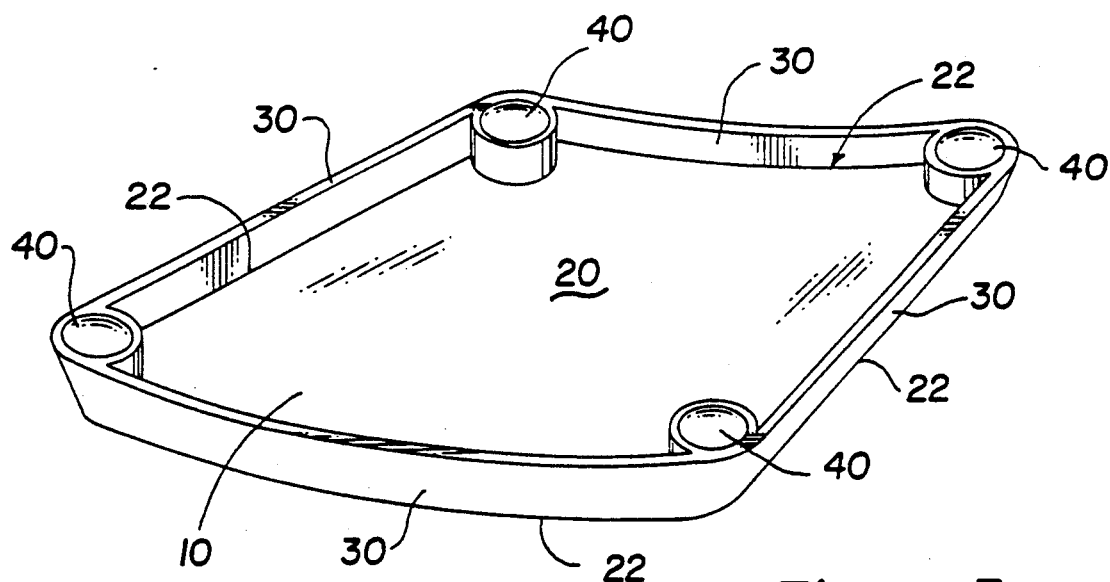
FIG. 3 is a perspective view from the other side of the cover illustrated in FIG. 2.
Figure 4A:
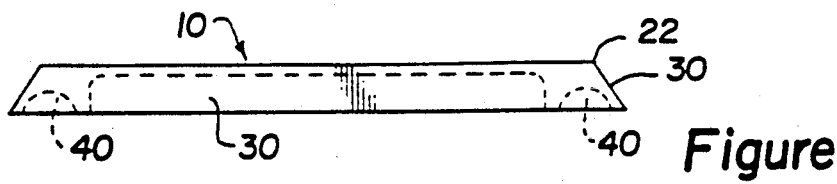
FIGS. 4a-4f show six elevation views of the cover illustrated in FIGS. 2 and 3.
Figure 4B:
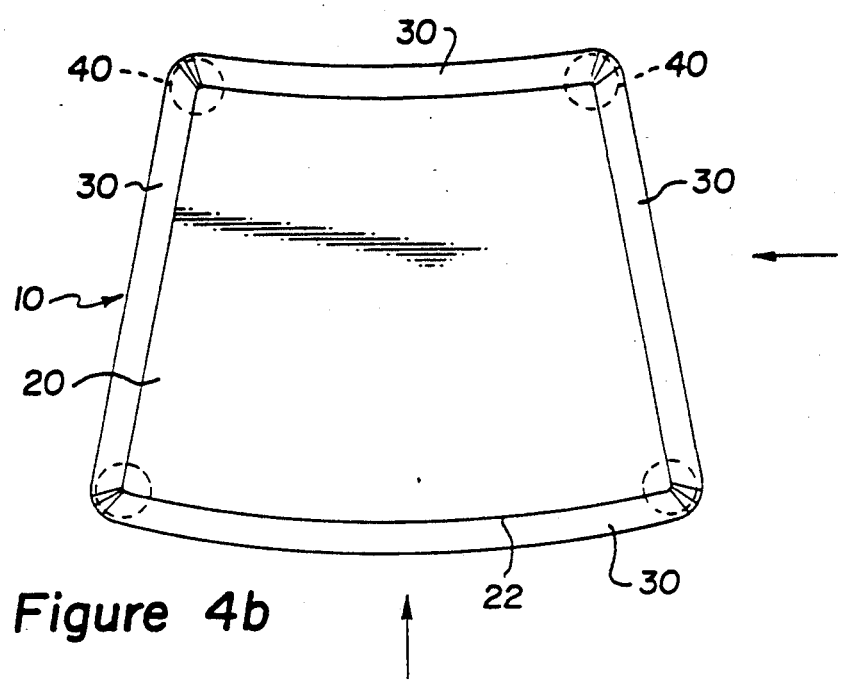
Figure 4C:
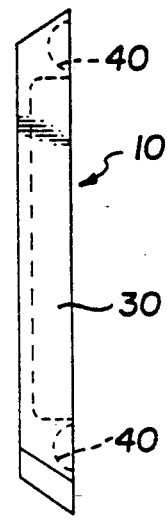
Figure 4D:
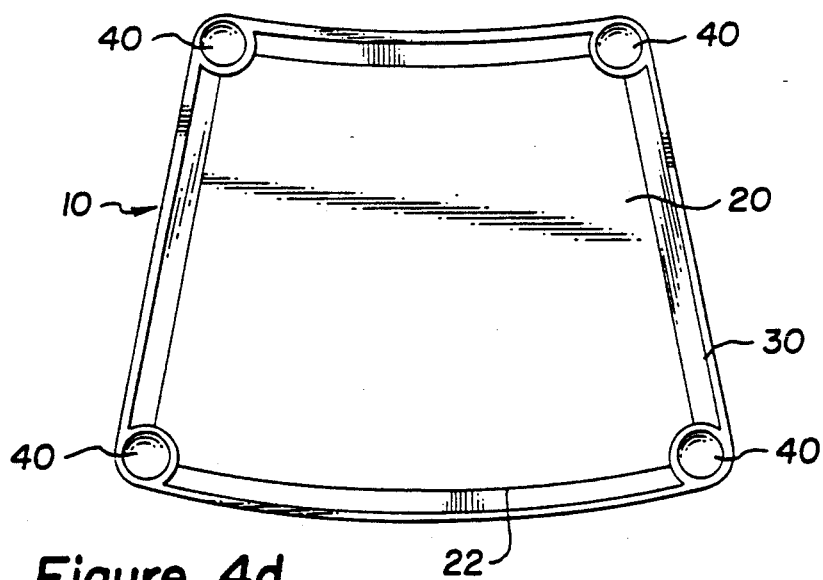
Figure 4E:
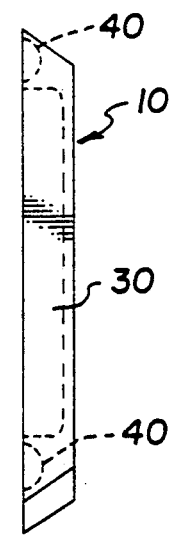
Figure 4F:
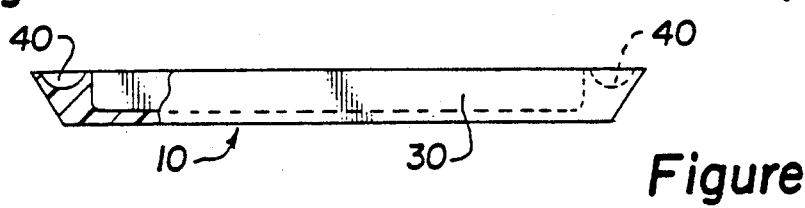

The present invention will be described by referring to apparatus and methods showing various examples of how the invention can be made and used. Like reference characters are used throughout the several figures and views of the drawing to indicate like or corresponding parts.

Referring now to FIG. 1 of the drawing, the cover of the present invention, generally referred to by the numeral 10, provides substantially complete coverage and sealing of at least part of the windshield or window 12 of a vehicle 14. For the purposes describing the invention and interpreting the appended claims, the term "windshield" is used, unless the context clearly requires otherwise, to mean and include both the forward facing windshield of a vehicle and any other window of a vehicle.

It is to be understood that the cover 10 can be formed in any suitable size and shape, and the particular shape shown in the Figures is merely for the purposes of illustration. For example, it is also contemplated that a single, larger cover according to the principles of the present invention could be used instead of the two covers illustrated in FIG. 1.

As shown in FIGS. 2, 3, and 4a-4f, according to a presently most preferred embodiment of the invention, the cover 10 has a sheet portion 20 and a raised skirt portion 30. The skirt portion 30 preferably extends from the perimeter 22 of the sheet portion 20. Most preferably, the sheet portion 20 and the skirt portion 30 are integrally formed of plastic material according to methods well known to those skilled in the art, for example, injection molding techniques.

The sheet portion 20 and skirt portion 30 of the cover 10 are preferably formed of a flexible plastic material that allows the cover 10 to substantially conform to the planar or curved surfaces of windshields and windows. On the other hand, these materials should be sufficiently stiff so that the sheet portion 20 can be supported in spaced-apart relationship to the windshield 12 and the skirt can be easily retained against the surface of the windshield.

The raised skirt portion 30 surrounds the sheet portion 20 and substantially closes the space between the windshield 12 and sheet portion 20, thereby forming a substantially sealed chamber between the overlapping surface areas of the sheet portion 20 and windshield 12.

A plurality of suction cups 40 are preferably attached to the cover 10 at the perimeter of the sheet portion 20. The suction cups 40 are used to removably attached the cover 10 to the windshield 12. If the cover 10 is generally rectangular in shape as shown in the drawing, the suction cups 40 are most advantageously positioned at the four corners of the rectangular shape as shown in the Figures.

In the preferred embodiment the raised skirt portion 30 provides at least partial support for the perimeter of the sheet portion 20 such that the sheet portion 20 is maintained in spaced-apart relation relative to the surface of the windshield 12. However, it is contemplated that the raised skirt portion 30 is not required to provide any support function for the sheet portion 20, which can be adequately supported by a plurality of suction cups 40 positioned around the perimeter of the sheet portion.

If the size and flexibility of the sheet portion 20 warrants, it is preferable to attach or form at least one suction cup to the middle portion of the surface area of the sheet material between the perimeter edges to provide support to the middle portion of the sheet material. Alternatively, additional raised skirt portions can be formed that extend across the middle of the sheet material 20 whereby said additional raised skirt portions support the middle of the sheet material in spaced-apart relation to the surface of the windshield.

The construction and operation of the suction cups 40 are well known in the art. In the presently preferred embodiment shown in the Figures, the suction cups 40 are integrally formed in the raised skirt portion 30 of the cover 10. However, it is also contemplated that certain materials are better suited to the formation and proper functioning of suction cups than others, and that these materials can be different from the more preferred materials for making the sheet portion 20 or the raised skirt portion 30. Thus, the suction cups 40 could alternatively be separately formed of different materials from the materials of the sheet portion and raised skirt portion and thereafter be attached to the sheet portion 20 or skirt portion 30 by any convenient means. For example, a stem of a separately manufactured suction cup could be inserted into a connector preformed in the body of the skirt portion (not shown).

As is apparent from the foregoing description, a protective cover according to the present invention can be easily attached and removed from the windshield by simply pressing the suction cups against the windshield or pulling the cover away from the windshield.

It is to be understood that the protective covers of the present invention must be mounted to the outside of the vehicle windshield to be effective against freezing accumulations of frost, sleet, and snow. However, the insulating characteristics of the protective covers disclosed herein can be effective for protecting the interior of the vehicle against excessive heat and damaging sunlight when installed either to the inside or the outside of the windshield. Since the cover creates a substantially sealed chamber between the sheet portion 20 and the windshield 12, the greenhouse effect caused by allowing air to circulate throughout the passenger compartment and between the sheet portion 20 and windshield 12 is substantially eliminated.

Figure 5A:
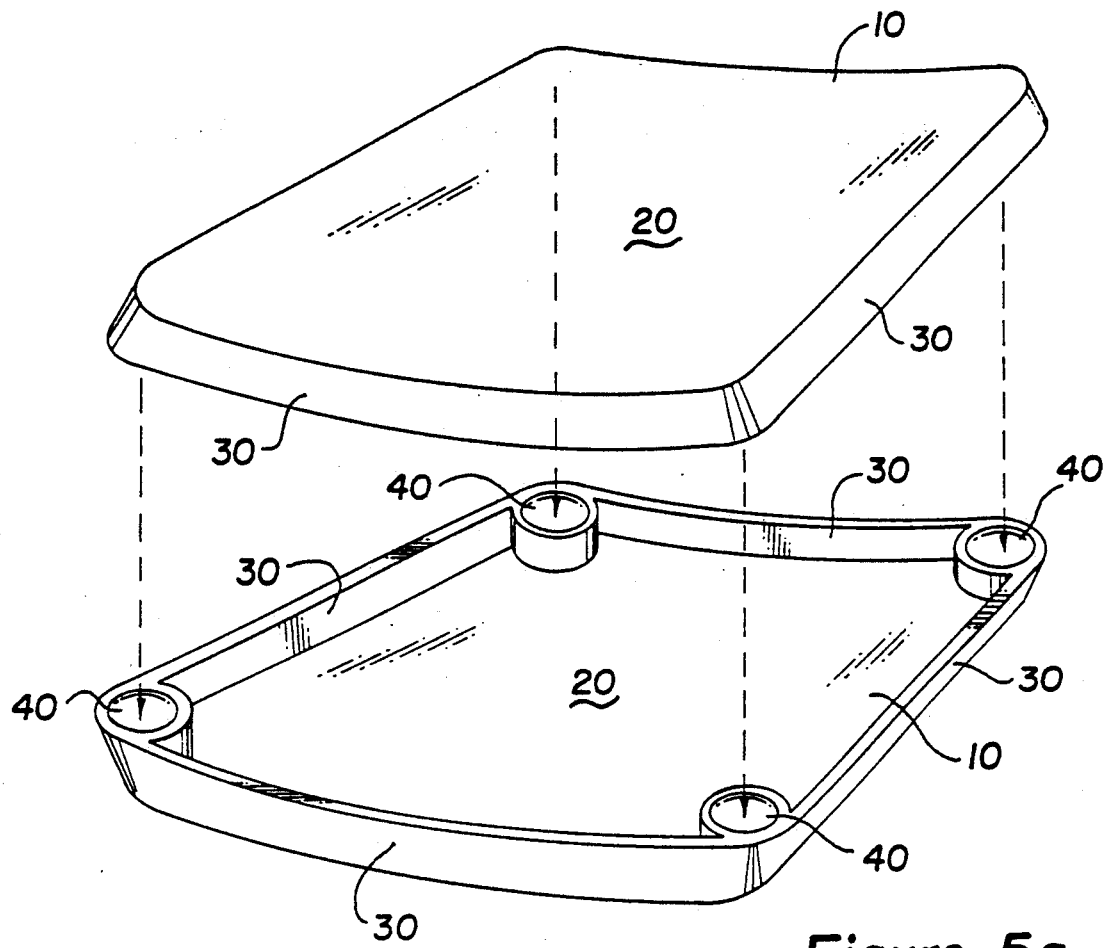
FIGS. 5a and 5b show perspective views of how two symmetrical covers as shown in FIGS. 2, 3, and 4a-4f can be aligned and then pressed together such that the suction cups retain the two covers together for storage.
Figure 5B:
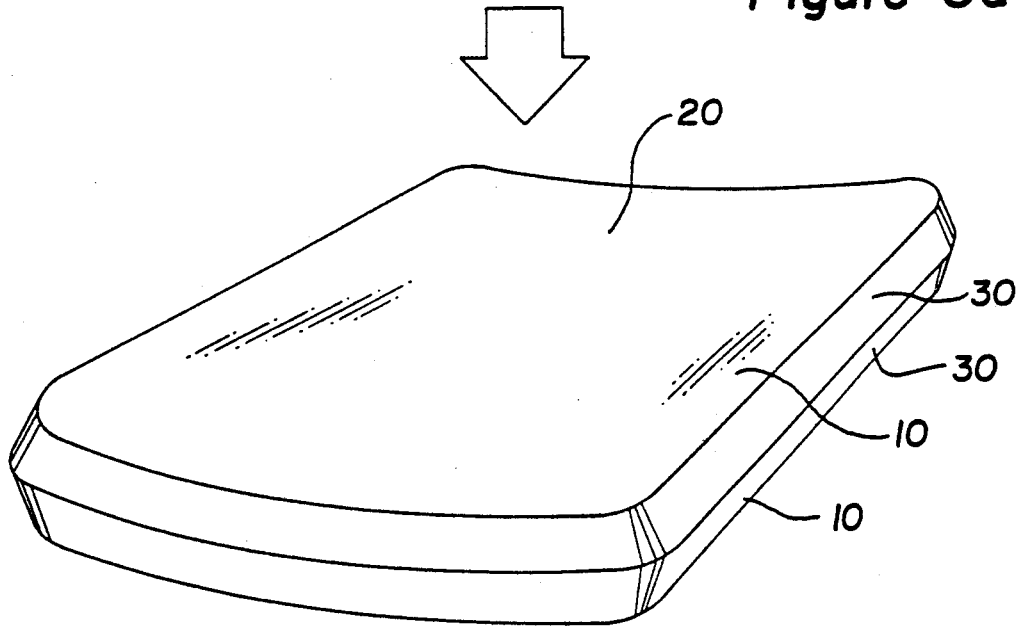

As best illustrated in FIGS. 5a and 5b, a pair of uncollapsible and symmetrical covers 10, which together can cover substantially the entire surface of a windshield, can be aligned and pressed together such that the suction cups 40 retain the pair of covers 10 together. Thus, for the convenience of carrying and storage, a pair of covers can be made into one compact unit.

It is also recognized that when the protective cover is mounted to the outside of the vehicle it could be subject to theft. Thus, it is further contemplated that the protective cover can be provided with an extending flap or strap (not shown) that is securely fastened to or integrally formed with the cover. Such a flap or strap can be positioned inside the vehicle such that when a door or window of the vehicle is closed, the flap or strap becomes securely clamped to the vehicle, thereby reducing the likelihood that the cover would be taken.

Preferably the sheet portion 20 and skirt portion 30 are formed of a material that is impervious to rain, sleet, or snow, such as plastic. It is also preferable to select a suitable material to maintain the desired flexibility under the severe weather condition of 120° F. to minus 50° F. Some of the suggested materials include: all weather plastics, such as polyethylene, and vinylacetate copolymer; rubber; synthetic rubber; however, paper materials such as corrugated cardboard are expected to be serviceable for some time.

Preferably the sheet material 20 is formed of a material that is substantially opaque to visible, near infra-red, and ultraviolet radiation. More preferably, the sheet material 20 of cover 10 is at least partially reflective to visible, near infra-red, and ultraviolet light. Furthermore, it is advantageous that the sheet material has one surface that is light colored and the opposite surface of which is dark colored. The dark colored surface can be oriented to face the interior of the vehicle and tends to reduce reflections of sunlight from other directions into the passenger compartment of the vehicle. Thus, in the preferred embodiment, the outward facing surface of sheet portion 20 is preferably silver or white in color, whereas the inner facing surface is preferably black.

Having described the invention, what is claimed is:

1. A protective cover for a windshield or window of a vehicle, the cover comprising:
    a sheet of material for at least partially overlaying a surface of the windshield, said sheet having a surface area and a perimeter;
    a raised skirt extending from adjacent the perimeter of said sheet; and
    a plurality of suction cups for removably mounting said sheet and said raised skirt to the windshield such that said sheet of material is spaced-apart from the surface of the windshield and such that said raised skirt closes the perimeter, whereby a chamber is formed by the surface of the windshield, said sheet of material, and said raised skirt.

2. The cover of claim 1 wherein said sheet and said raised skirt are substantially impervious to moisture.

3. The cover of claim 1 wherein said sheet and said raised skirt material are integrally formed of a flexible plastic material.

4. The cover of claim 1 wherein said sheet is substantially opaque to visible, near infra-red, and ultraviolet light.

5. The cover of claim 4 wherein said sheet is at least partially reflective to visible, near infra-red, and ultraviolet light.

6. The cover of claim 4 wherein said sheet has one surface that is light colored and the opposite surface that is dark colored.

7. The cover of claim 4 wherein said sheet and said raised skirt are substantially impervious to moisture.

8. The cover of claim 1 wherein said plurality of suction cups are attached to said raised skirt.

9. A windshield protective cover for a vehicle, the cover being formed of a sheet material and having a plurality of suction cups for applying the cover to a windshield of a vehicle, the sheet material being spaced-apart from the surface of the windshield such that there is a gap formed therebetween, wherein the improvement comprises:
    a flexible skirt connected adjacent to the perimeter of the sheet material, said flexible skirt substantially sealing the perimeter of the gap formed between the spaced-apart sheet material and the windshield whereby at least one substantially sealed chamber is formed between the sheet material and the windshield.

10. The windshield protective cover of claim 9 wherein said sheet material and said raised skirt are substantially impervious to moisture.

11. The windshield protective cover of claim 9 wherein said sheet material is substantially opaque to visible, near infra-red, and ultraviolet light.

* * * * *